United States Patent
Prajapati et al.

(10) Patent No.: US 11,494,455 B2
(45) Date of Patent: Nov. 8, 2022

(54) FRAMEWORK FOR JUST-IN-TIME DECISION SUPPORT ANALYTICS

(71) Applicant: SAP SE, Walldrof (DE)

(72) Inventors: Rishi Prajapati, Bangalore (IN); Pranav Anil Acharya, Bangalore (IN)

(73) Assignee: SAP SE, Walldorf (DE)

( * ) Notice: Subject to any disclaimer, the term of this patent is extended or adjusted under 35 U.S.C. 154(b) by 539 days.

(21) Appl. No.: 16/572,407

(22) Filed: Sep. 16, 2019

(65) Prior Publication Data
US 2021/0081483 A1 Mar. 18, 2021

(51) Int. Cl.
*G06F 16/9538* (2019.01)
*G06F 16/2457* (2019.01)
*G06F 16/901* (2019.01)
*G06F 40/14* (2020.01)

(52) U.S. Cl.
CPC .... *G06F 16/9538* (2019.01); *G06F 16/24578* (2019.01); *G06F 16/9017* (2019.01); *G06F 40/14* (2020.01)

(58) Field of Classification Search
None
See application file for complete search history.

(56) References Cited

U.S. PATENT DOCUMENTS

2017/0132195 A1* 5/2017 Gothi ............... G06F 40/18
2017/0344895 A1* 11/2017 Roy ................ G06N 20/00

* cited by examiner

Primary Examiner — Amresh Singh
(74) Attorney, Agent, or Firm — Fountainhead Law Group P.C.

(57) ABSTRACT

A framework for implementing just-in-time decision support analytics within a business application deployment are provided. In one set of embodiments, the framework enables an application user to be presented with analytics that are in-context and in-place with respect to an operational workflow carried out by the user, where "in-context" means that the presented analytics are directly relevant to, and tailored for, the specific business context of the user's operational workflow, and "in-place" means that the analytics are displayed to the user within the same UI/application used to execute the operational workflow, and at the same time the workflow is actually executed. These characteristics advantageously ensure that the user is provided with the insights he/she needs to make confident business decisions and facilitates real-time decision making for time-critical operations.

15 Claims, 4 Drawing Sheets

FRAMEWORK FOR JUST-IN-TIME DECISION SUPPORT ANALYTICS

BACKGROUND

In existing business application deployments that provide both operational workflows and analytic dashboards, there is typically a disconnect between analytics consumption and operational decision/action execution. For example, many analytic dashboards are designed to be reviewed by upper-level management rather than by operational users. As a result, if a manager spots an issue via a dashboard that pertains to, e.g., inventory management, the manager must communicate the issue to the employee that is actually responsible for managing inventory levels in the system. This transfer of information can potentially lead to information loss, time delay, and scenarios where the original analytic data becomes stale by the time a remedial decision or action is taken.

Further, even if an operational user is provided access to an analytic dashboard, that dashboard (1) may be presented in a completely different user interface (UI) or application than the UI/application employed by the user for carrying out his or her operational workflows, and (2) may include a multitude of different types of data (and representations of the data) that are relevant to the operation of the organization as a whole, but are largely irrelevant to the specific business domain/context of the user. Thus, with respect to (1), the user must switch UIs/application windows in order to assimilate the analytic data during execution of a workflow, and with respect to (2), the user must manually sift through all of the analytic data presented in the dashboard in order to find the particular pieces of information, if any, that are relevant to his or her business context. Both of these issues undesirably increase the cognitive load on the user and the overall time needed to take an operational decision/action.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to a framework for implementing "just-in-time decision support analytics" within a business application deployment. At a high level, this framework enables a user of a business application of the deployment to be presented with analytics that are in-context and in-place with respect to an operational workflow carried out by the user. As used herein, "in-context" means that the presented analytics are directly relevant to, and tailored for, the specific business context of the user's operational workflow. For example, if the operational workflow is a workflow for creating a purchase order, the analytics may include graphs and/or key performance indicators (KPIs) identifying the shipping lead times and costs of various potential suppliers of the purchase order. This advantageously ensures that the user is provided with the insights he/she needs in order to make an informed and confident business decision with respect to the workflow, such as sending the purchase order to supplier A rather than alternative suppliers B or C.

Further, "in-place" means that the analytics are displayed to the user within the same UI/application used to execute the operational workflow, and at the same time the workflow is actually executed. This advantageously avoids the need for the user to switch back and forth between different application windows/tabs in order to assimilate the analytic data, or to try and recall analytic data that the user may have accessed several hours or days prior, which in turn facilitates faster decision making for time-critical operations.

The foregoing and other aspects of the present disclosure are described in further detail in the sections that follow.

2. Solution Architecture and High-Level Approach

Figure 1:
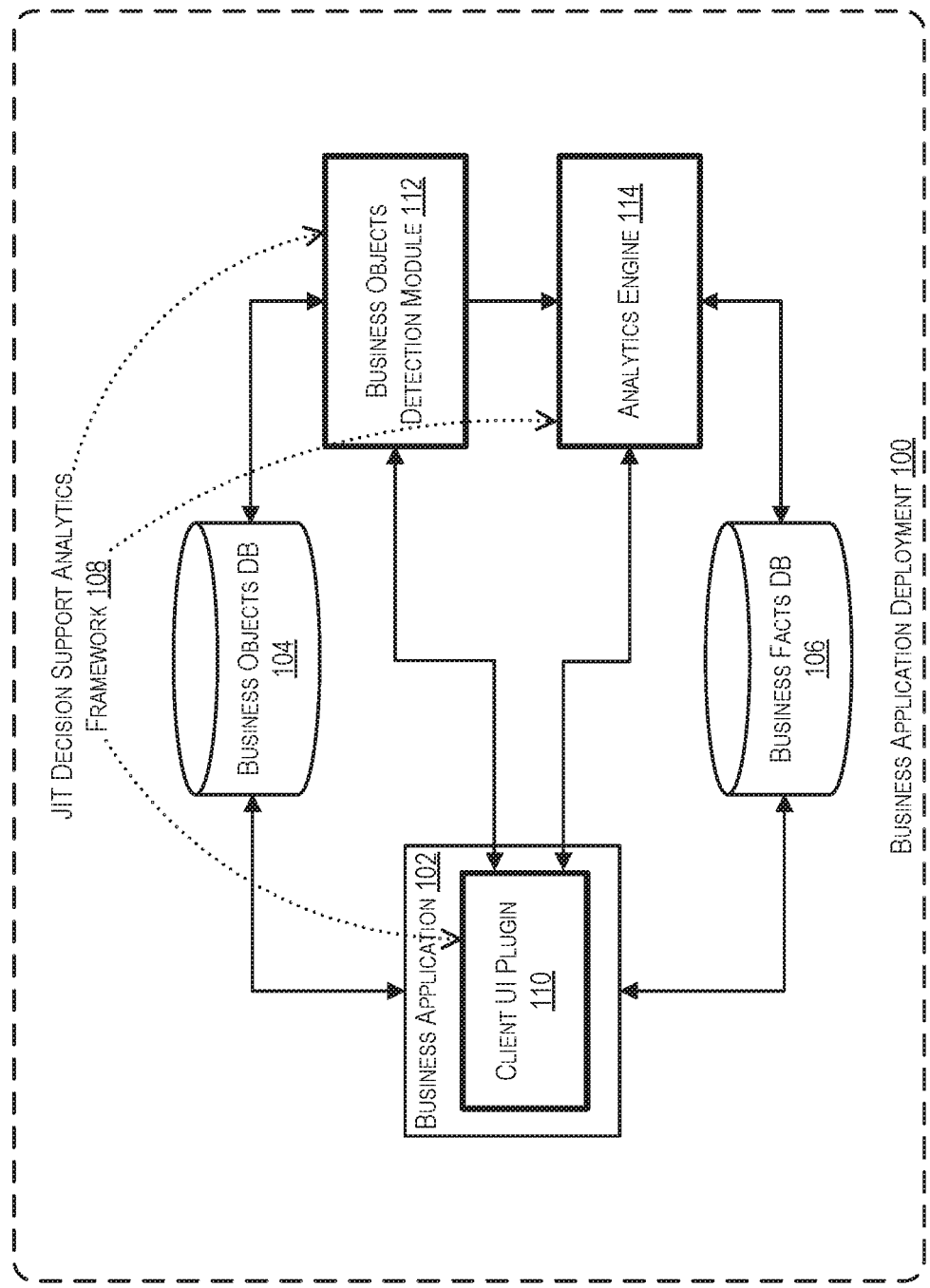
FIG. 1 depicts an example business application deployment that implements the framework of the present disclosure according to certain embodiments.

FIG. 1 is a simplified block diagram of a business application deployment 100 that implements the framework of the present disclosure according to certain embodiments. As shown deployment 100 includes, among other things, a business application 102, a business objects database 104, and a business facts database 106. Although exactly one of each of these entities is depicted for purposes of illustration, any number of these entities may be supported.

Business application 102 is a software application that enables users to carry out one or more workflows pertaining to the operation of an organization or enterprise. As one example, business application 102 may be an inventory management and procurement application that enables users to identify/validate suppliers, authorize purchase requests, create purchase orders, and so on.

Business objects database 104 is a datastore that maintains business objects used by business application 102 as part of its normal operation. For instance, in the example where business application 102 pertains to inventory management and procurement, business objects database 104 may include database tables for storing suppliers (e.g., names, addresses, etc.), authorized purchase requestors, inventory items, etc. These business objects are generally independent of specific transactions (i.e., they pertain to information that may be repeated across different transactions, such as supplier A, supplier B, inventory item number X, etc.), and thus are considered non-transaction-specific data.

Business facts database 106 is a datastore that store aggregations of transaction-specific data that is generated by business application 102. Such transaction-specific data can include, e.g., units sold, unit costs, and other measurable quantities. This data is updated on a regular basis as users of business application 102 submit new transactions via the operational workflows provided by the application.

As noted in the Background section, in existing business application deployments, analytic data (i.e., data that aids users in taking operational decisions/actions) is typically provided via dashboards that are separate from the workflow UIs where those decision/actions are actually determined and executed. This means that the analytic data is not provided in-place with an operational workflow, which can result in various issues such as the need to communicate the analytics from one user to another, the need to switch between multiple application windows/tabs in order to assimilate the analytic data during a given operational workflow, and/or the need to remember analytics viewed/accessed previously.

In addition, existing analytic dashboards are generally static in nature and are designed with upper-level management or executives in mind. Thus, they often include many different data sources and data representations that provide an overview of an organization or organization segment as a whole, rather than a targeted view of a specific business context within the organization. This means that a user that is tasked with executing an operational workflow pertaining to a particular business context cannot quickly glance at such an analytic dashboard and easily glean the insights that are relevant to his or her workflow; instead, the user must painstakingly sift through the large amounts of analytic data presented in the dashboard in the hopes of finding what he or she is looking for.

To address the foregoing and other similar issues, deployment 100 of FIG. 1 is enhanced to include a novel "just-in-time decision support analytics" framework 108 comprising three framework components: (1) a client UI plugin 110 residing within business application 102, (2) a business objects detection module 112, and (3) an analytics engine 114. As shown, business objects detection module 112 is communicatively coupled with client UI plugin 110, business objects database 104, and analytics engine 114 respectively, while analytics engine 114 is communicatively coupled with business objects detection module 112, client UI plugin 110, and business facts database 106 respectively.

Figure 2:
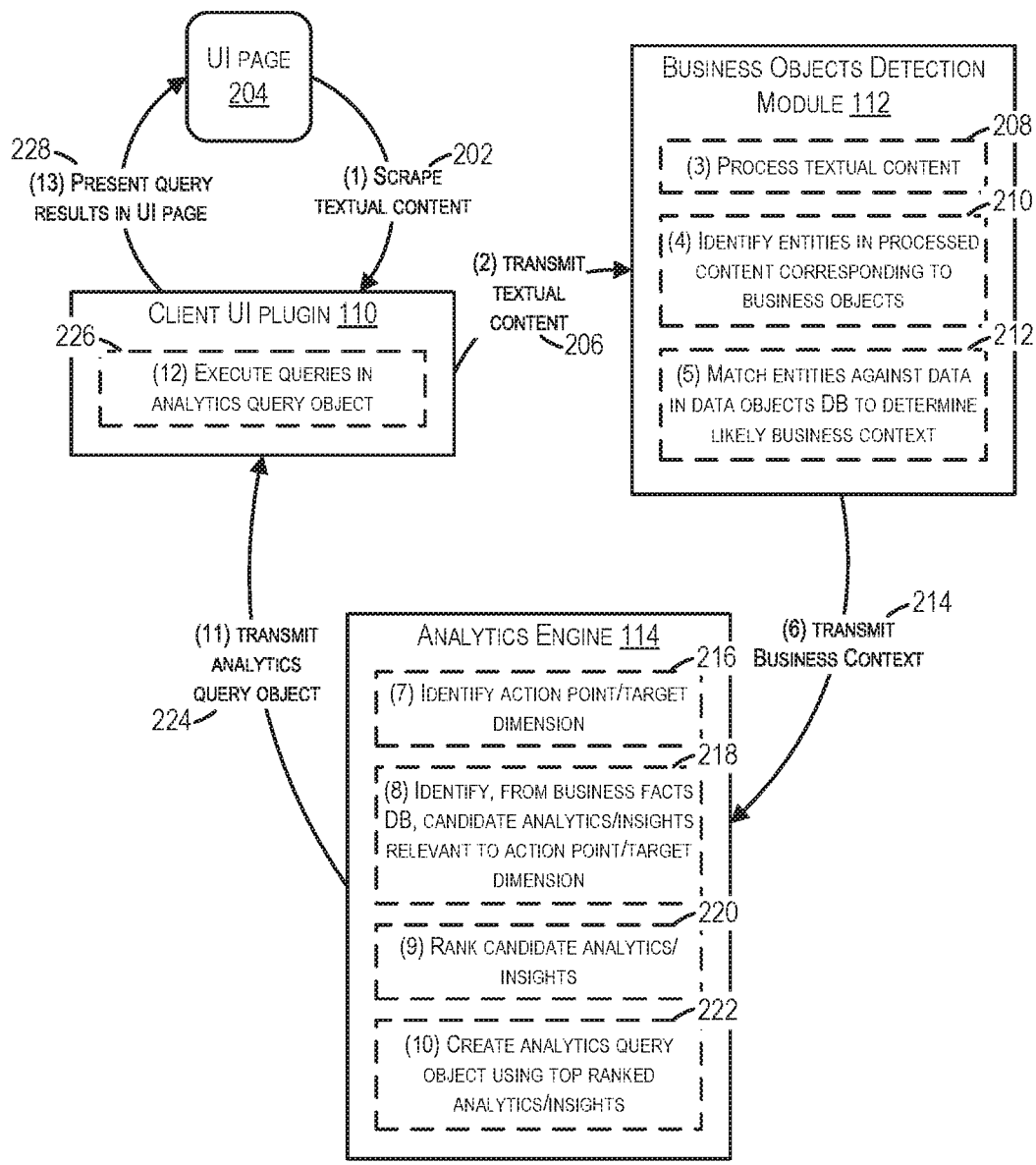
FIG. 2 depicts a high-level flow diagram that may be executed by the framework of the present disclosure according to certain embodiments.

As mentioned previously, framework components 110, 112, and 114 can work in concert with each other and with the other entities of deployment 100 to enable a user of business application 102 to view analytics that are in-context and in-place with respect to an operational workflow carried out by the user. FIG. 2 depicts a high-level flow diagram 200 that illustrates how this may be achieved in accordance with certain embodiments.

Starting with step (1) of flow diagram 200 (reference numeral 202), client UI plugin 110 can scrape (i.e., extract) textual content from a UI page (e.g., web page) 204 of business application 102 that is part of the operational workflow being carried out by the user. For example, the operational workflow may be a workflow for creating a purchase order and UI page 204 may be a UI for selecting a supplier for a given item X in the purchase order. At step (2) (reference numeral 206), client UI plugin 110 can send the scraped textual content to business objects detection module 112.

At steps (3)-(5) (reference numerals 208-212), business objects detection module 112 can process the textual content (which can include, e.g., text sanitization); identify, within the processed textual content, entities that correspond to business objects; and match the identified entities against the data maintained in business objects database 104 to determine a likely business context for UI page 204. For instance, business objects detection module 112 may determine that the likely business context for UI page 204 is supplier selection for a purchase order.

At step (6) (reference numeral 214), business objects detection module 112 can transmit a representation of the identified context to analytics engine 114. In one set of embodiments, this representation may take the form of a list of database tables in business objects database 104 that are associated with the likely business context.

In response, at step (7) (reference numeral 216), analytics engine 114 can identify an action point (and an associated "target dimension") for the likely business context. As described in further detail below, this action point/target dimension can correspond to a specific action or decision to be undertaken by the user within UI page 204, such as the selection of a particular supplier.

Upon identifying the action point/target dimension, analytics engine 114 can identify, via accessing business facts database 106, a set of candidate analytics/insights that may be relevant to the action point/target dimension identified at step (7) (step (8), reference numeral 218) and can rank the candidate analytics/insights (step (9), reference numeral 220). For example, such candidate analytics/insights may include the average shipping times of various suppliers, shipping costs, inventory levels, etc.

Analytics engine 114 can then create an analytics query object based on one or more of the top ranked analytics/insights (step (10), reference numeral 222), where the analytics query object includes one or more queries for retrieving data pertaining to the top ranked analytics/insights from one or more databases (such as, e.g., business facts database 106). Once created, analytics engine 114 can transmit this analytics query object to client UI plugin 110 (step (11), reference numeral 224).

Finally, at steps (12) and (13) (reference numerals 226 and 228), client UI plugin 110 can execute the one or more queries included in the analytics query object and can present the results to the user directly within UI page 204, thereby aiding the user in taking an appropriate action/decision with respect to that page.

With the high-level approach shown in FIG. 2, a number of advantages are achieved over existing implementations. First, this approach is driven by the specific business context embodied in the UI page(s) of business application 102 that are accessed by the user. As a result, the analytics that are determined and presented to the user via this approach are tailored to the business decision/action at hand and avoids the clutter and "information overload" that is typical with executive dashboards.

Second, the high-level approach of the present disclosure presents the determined analytics within the very same UI/application window as the operational workflow being carried out by the user, and at approximately the same time. This avoids the need to switch UIs/windows to retrieve analytic data from, e.g., a separate dashboard, which in turn reduces the cognitive load on the user and facilitates real-time decision making Third, through the process of linking action points/target dimensions to a wide variety of candidate analytics/insights and ranking the candidate analytics/insights via a configurable cost function, the high-level approach of the present disclosure can maximize the likelihood that the determined analytics are relatable and allow the user to make confident business decisions. In some embodiments, relevant analytics/insights may be persisted with the user decisions/actions taken, thereby training the overall framework and increasing its precision over time.

The remaining portions of this disclosure provide additional details regarding how high-level flow diagram 200 may be implemented by framework components 110, 112, and 114 according to various embodiments. It should be appreciated that FIGS. 1 and 2 are illustrative and not intended to limit embodiments of the present disclosure. For instance, although FIG. 1 depicts a particular arrangement for framework components 110-114, other arrangements are possible (e.g., the functionality attributed to a particular component may be split into multiple components, components may be combined, etc.). Further, framework 108 may include other components/sub-components and/or implement other functions that are not specifically described. One of ordinary skill in the art will recognize other variations, modifications, and alternatives.

3. Example Implementation

Figure 3:
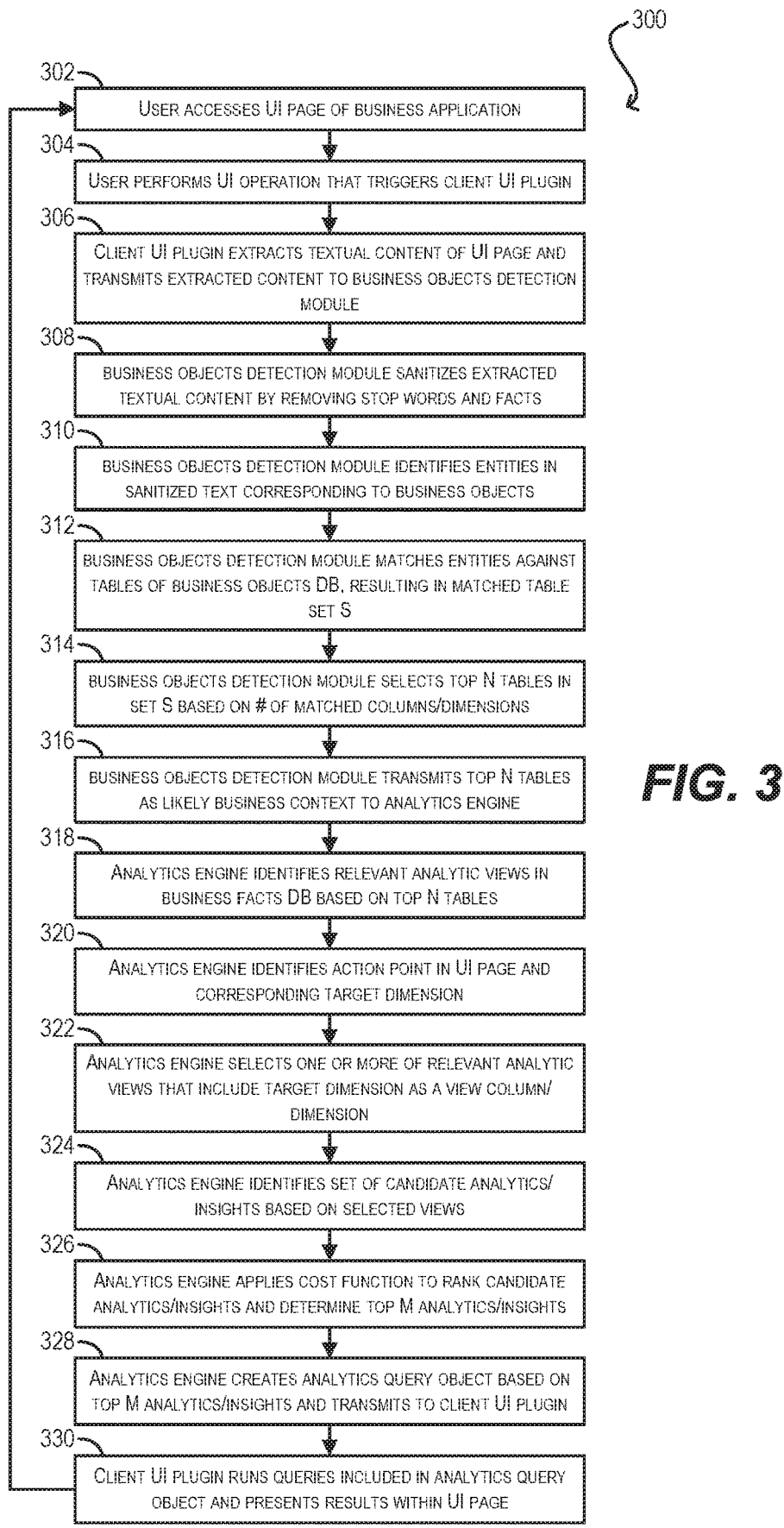
FIG. 3 depicts a flowchart that provides additional implementation details regarding the high-level flow diagram of FIG. 2 according to certain embodiments.

FIG. 3 depicts a flowchart 300 that details one possible implementation of high-level flow diagram 200 of FIG. 2 according to certain embodiments.

Starting with blocks 302 and 304, a user of business application 102 can access a UI page (i.e., page 204) of the application as part of an operational workflow and can perform a UI operation that triggers client UI plugin 110. For example, if UI page 204 pertains to the selection of a supplier as part of a create purchase order workflow, the user may activate a UI element (e.g., dropdown selection box, pick list, etc.) for selecting the supplier, which plugin 110 is configured to detect.

Upon detecting the triggering operation at block 304, client UI plugin 110 can extract the textual content of UI page 204 and can transmit the extracted textual content to business objects detection module 112 (block 306).

At block 308, business objects detection module 112 can sanitize the extracted textual content by, e.g., removing stop words and facts from the content. As used herein, "stop words" refer to common words that are not relevant for the purposes of framework 108, such as "the," "is," "at," "which," and the like. "Facts" refer to measurable (i.e., numerical) units, such as "100" widgets. Business objects detection module 112 can then identify a collection of entities in the sanitized text (block 310), where an "entity" is a business object used by the application (e.g., supplier, inventory item, etc.).

At block 312, business objects detection module 112 can match the entities identified at block 310 against database tables included in business objects database 104 that correspond to the tenant (i.e., organizational customer) operating business application 102. For example, if module 112 identified a "supplier name" entity at block 310, the module may match this entity to one or more database tables in business objects database 104 that include "supplier name" as one of the columns (i.e., dimensions) of the table. In various embodiments, this can result in a set of database tables S where, for each database table in S, at least one entity matches at least one column/dimension in the table.

Business objects detection module 112 can subsequently select the top N database tables in set S based on the number of matched columns/dimensions (i.e., the N tables whose columns/dimensions match the most entities identified at block 310) and can transmit these top N tables (which are considered to represent the likely business context of UI page 204) to analytics engine 114 (blocks 314 and 316).

At block 318, analytics engine 114 can receive the top N database tables from business objects detection module 112 and can identify relevant analytic views in business facts database 106 based on the top N tables. As used herein, an "analytic view" is an aggregated view of the data in one or more tables defined by, e.g., a data analyst for analytical purposes. It is assumed that business facts database 106 is populated with such analytic views for purposes of multi-dimensional exploration and analysis. A "relevant" analytic view in the context of block 318 is an analytic view that has a certain threshold number of view columns/dimensions that match an entity found in one or more of the top N tables. For instance, if the threshold number is 2 and an analytic view V1 in business facts database 106 has 3 view columns that match entities "supplier name," "supplier address," and "supplier telephone" found in the top N tables received from business objects detection module 112, view V1 can be identified as a relevant analytic view.

Further, at block 320, analytics engine 114 can identify an action point in UI page 204, which in turn is used to derive a target dimension. As mentioned previously, this action point refers to some decision or action to be undertaken by the user within UI page 204, such as the selection of a particular supplier. In this example, the target dimension associated with the action point may be "supplier name." In certain embodiments, analytics engine 114 can identify the action point and/or target dimension by inspecting a DOM (Document Object Model) element received from business objects detection module 112 or client UI plugin 110, where the DOM element corresponds to the page UI element that was triggered at block 304.

Upon identifying the relevant analytic views from business facts database 106 and the target dimension, analytics engine 114 can select one or more of the relevant analytic view that include the target dimension as a view column/dimension and can identify a set of candidate analytics/insights based on the selected view(s) (blocks 322 and 324). As used here, "analytics" can refer to traditional methods/operations for representing data in different ways, such as aggregation, filtering, sorting, etc., whereas "insights" can refer to more advanced models (e.g., prediction, key influencer analysis, etc.). For instance, if the target dimension is "supplier name" as indicated above, the identified candidate analytics/insights may include, e.g., a KPI associated with supplier delivery time, a sorted list of suppliers by shipping costs, etc.

Analytics engine 114 can then apply a cost function to rank the candidate analytics/insights and select, e.g., the top M analytics/insights (block 326). The exact nature of this cost function can vary depending on the characteristics of business application 102 and/or the needs of the customers/users using the application. In a particular embodiment, the cost function can be defined via, e.g., a configuration file and provided as input to analytics engine 114.

At block 328, analytics engine 114 can create an analytics query object based on the top M analytics/insights selected at block 326 and can transmit the query object to client UI plugin 110. This query object can include one or more database queries (either in an abstract or language-specific (e.g., SQL) format) that can be executed by client UI plugin 110 in order to generate output for the top M analytics/insights. For example, the following is an example query that may be included in the analytics query object:

Listing 1

{ measures: ["delivery_time"], dimensions: ["shipper"], sort: { measureName: "delivery time", criteria:"ascending" }}

In certain embodiments the queries included in the analytic query object may be directed to business facts database 106, but in other embodiments they may also be directed to other databases within or external to deployment 100.

Finally, at block 330, client UI plugin 110 can receive the analytics query object from analytics engine 114, execute the queries included in the object based on, e.g., the access rights of the logged-in user, and can present the results of the queries within UI page 204. Flowchart 300 can thereafter return to block 302 the entire process can be repeated when the user performs another UI operation in UI page 204 (or another UI page) that triggers the text extraction function of client UI plugin 110.

4. Example Computer System

Figure 4:
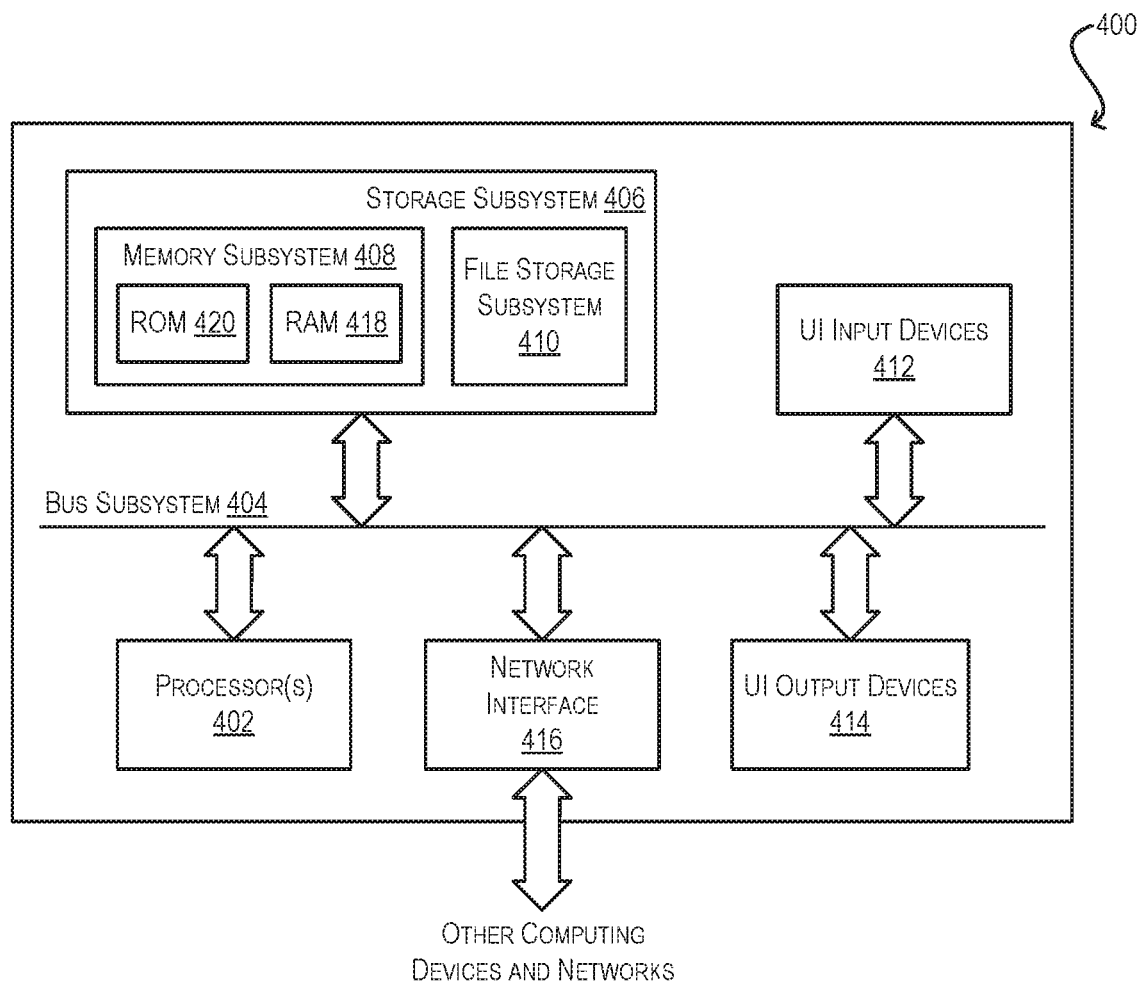
FIG. 4 depicts an example computer system according to certain embodiments.

FIG. 4 depicts an example computer system 400 according to certain embodiments. Computer system 400 may be used to execute any of the framework components, including components 110, 112, and 114, described in the foregoing disclosure.

As shown, computer system 400 can include one or more processors 402 that communicate with a number of peripheral devices via a bus subsystem 404. These peripheral devices can include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computer system 400 communicate with each other as intended. Although bus subsystem 404 is shown schematically as a single bus, alternative embodiments of the bus subsystem can utilize multiple busses.

Network interface subsystem 416 can serve as an interface for communicating data between computer system 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

User interface input devices 412 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computer system 400.

User interface output devices 414 can include a display subsystem (e.g., a flat-panel display), an audio output device (e.g., a speaker), and/or the like. In general, use of the term "output device" is intended to include all possible types of devices and mechanisms for outputting information from computer system 400.

Storage subsystem 406 can include a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 400 is illustrative and many other configurations having more or fewer components than computer system 400 are possible.

The above description illustrates various embodiments of the present disclosure along with examples of how aspects of the present disclosure may be implemented. The above examples and embodiments should not be deemed to be the only embodiments and are presented to illustrate the flexibility and advantages of the framework disclosed herein and as defined by the following claims.

For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a computer system, textual content extracted from a user interface (UI) page of a business application, the UI page being part of an operational workflow executed by a user;
   identifying, by the computer system, a plurality of entities in the textual context corresponding to business objects used by the business application;
   matching, by the computer system, the identified plurality of entities to one or more database tables maintained in a first database associated with the business application;
   determining, by the computer system based on the matched one or more database tables, a likely business context for the UI page;
   identifying an action point associated with the UI page, the action point representing a decision point or action to be taken by the user within the UI page;
   determining a target dimension from the action point; and
   identifying one or more candidate analytics or insights based on the target dimension and the likely business context,
   wherein identifying the one or more candidate analytics or insights comprises:
   identifying, in a second database associated with the business application, a plurality of analytic views that are relevant to the likely business context; and
   selecting one or more of the analytic views that include the target dimension as a view column.

2. The method of claim 1 further comprising, prior to identifying the plurality of entities:
   sanitizing the textual content by eliminating stop words and facts.

3. The method of claim 1 wherein matching the identified plurality of entities to the one or more database tables comprises:
   identifying database tables in the first database that include at least one database column matching an entity in the plurality of entities.

4. The method of claim 1 wherein determining the likely business context comprises:
   selecting a subset of the one or more database tables whose database columns match the most entities in the plurality of entities; and
   defining the likely business context as corresponding to the selected subset.

5. The method of claim 1 wherein identifying the action point comprises:
inspecting a DOM (Document Object Model) element of the UI page that triggered extraction of the textual content.

6. The method of claim 1 further comprising:
ranking the one or more candidate analytics or insights based on a user-defined cost function; and
selecting a subset of the one or more candidate analytics or insights determined to have the highest rank.

7. The method of claim 6 further comprising:
generating an analytics query object using the selected subset of the one or more candidate analytics or insights, the analytics query object including one or more queries for generating output for the selected subset.

8. The method of claim 7 wherein the one or more queries are directed to the second database comprising the plurality of analytic views.

9. The method of claim 7 further comprising:
executing the one or more queries included in the analytics query object; and
presenting results of the one or more queries within the UI page of the business application.

10. A computer system comprising:
a processor; and
a non-transitory computer readable storage medium having stored thereon program code that, when executed by the processor, causes the processor to:
detect execution of an operation in a user interface (UI) page of a business application, the operation corresponding to an operational decision or action to be taken by a user of the business application;
in response to detecting execution of the operation, extract textual content from the UI page;
transmit the extracted textual content to one or more other computer systems;
receive, from the one or more other computer systems, an object that includes one or more queries corresponding to analytics or insights relevant to the operational decision or action to be taken by the user;
execute the one or more queries; and
present results of the one or more queries within the UI page of the business application,
wherein the analytics or insights are determined by:
identifying entities in the extracted textual content; and
matching the entities to database tables in a business objects database, the business objects database being configured store business objects used by the business application, and
wherein the analytics or insights are further determined by:
determining a likely business context for the UI page based on the matching;
determining a target dimension based on the detected execution of the operation;
identifying candidate analytics or insights from a business facts database based on the target dimension and the likely business context; and
ranking the candidate analytics or insights to determine the analytics or insights included in the analytics query object.

11. The computer system of claim 10 wherein the operation is an activation of a UI element within the UI page.

12. The computer system of claim 10 wherein the one or more queries are directed to a business facts database associated with the business application, the business facts database being configured to store transaction-specific data generated by the business application.

13. The computer system of claim 12 wherein the business facts database is further configured to store one or more analytic views defined by a data analyst.

14. The computer system of claim 10 wherein the candidate analytics or insights are ranked using a cost function defined via configuration file.

15. A non-transitory computer readable medium having stored thereon program code executable by one or more computer systems, the program code comprising:
code for extracting textual content from a user interface (UI) page of a business application, the UI page being part of an operational workflow executed by a user;
code for identifying a plurality of entities in the textual context corresponding to business objects used by the business application;
code for matching the plurality of entities to one or more database tables maintained in a first database associated with the business application;
code for determining, based on the matched one or more database tables, a likely business context for the UI page;
code for identifying a target dimension associated with the UI page;
code for identifying analytic views from a second database associated with the business application that are relevant to the likely business context;
code for identifying one or more analytics or insights based on the analytic views and the target dimension;
code for executing a query pertaining to the one or more analytics or insights; and
code for presenting results of the query within the UI page to the user.

* * * * *